UNITED STATES PATENT OFFICE.

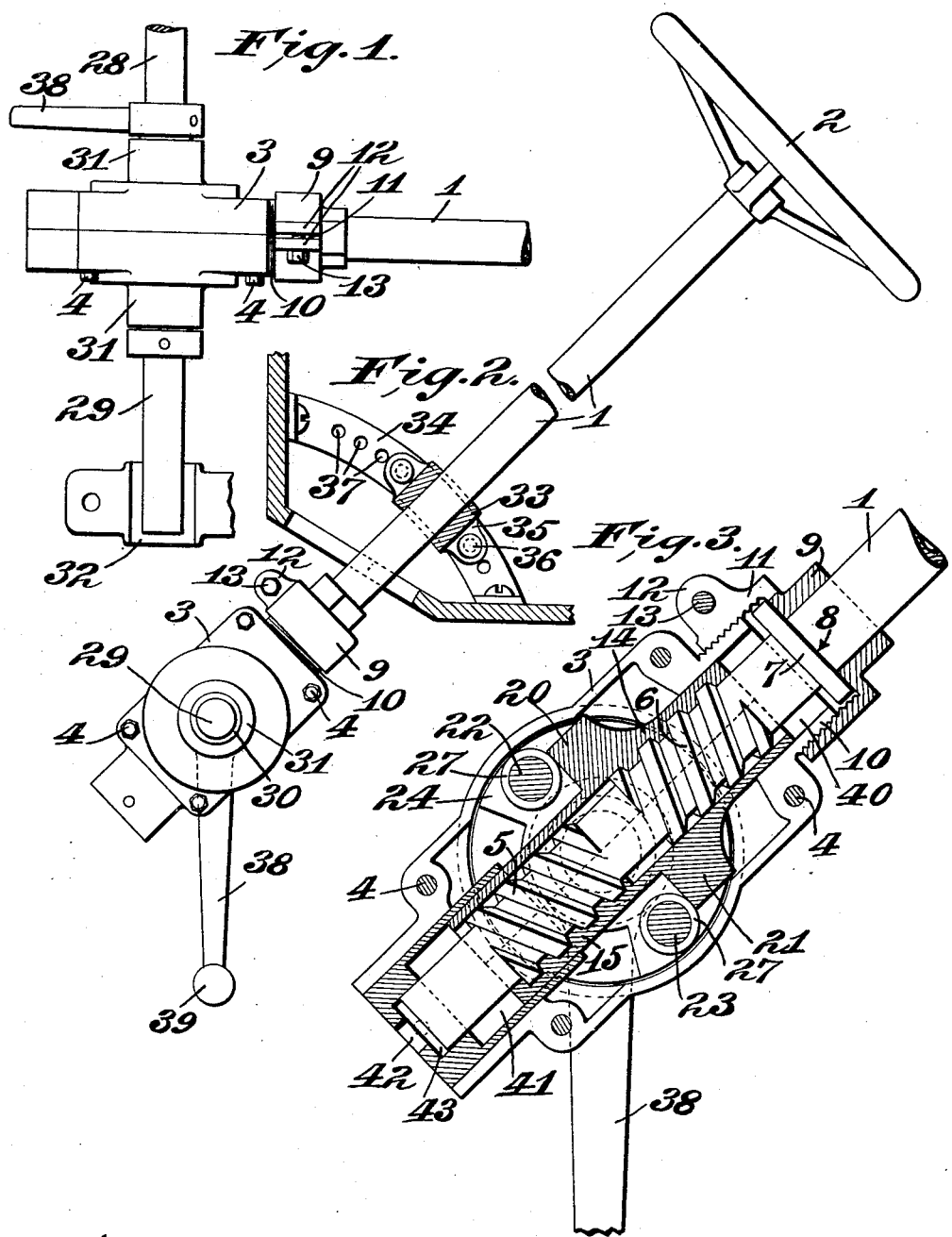

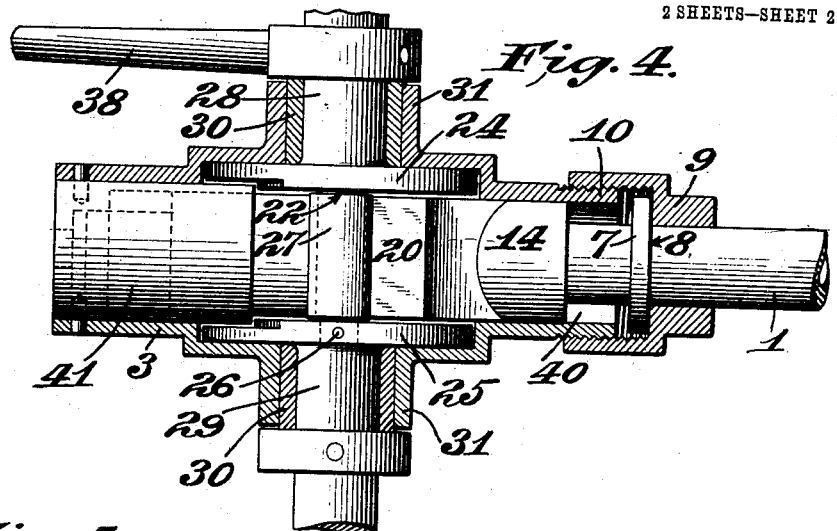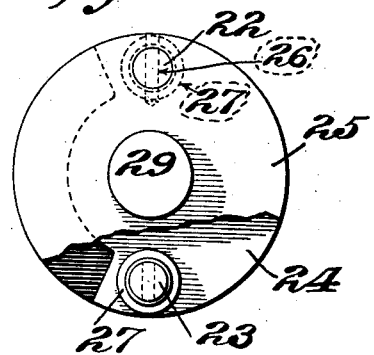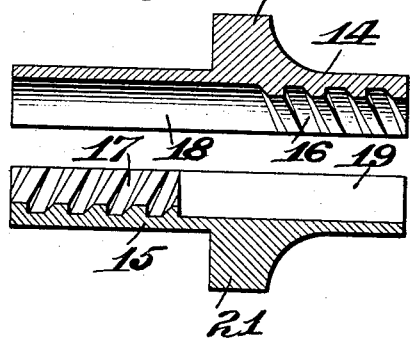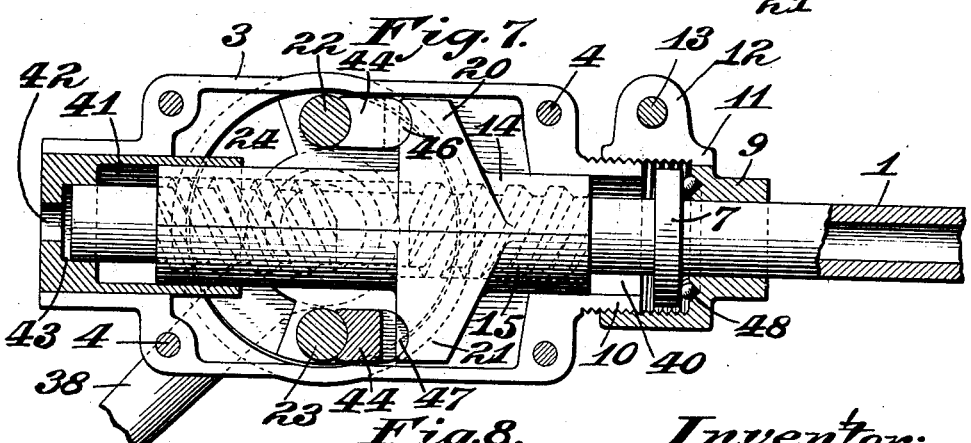

CHARLES E. BROOKS, OF ST. LOUIS, MISSOURI, ASSIGNOR TO B. ROTH TOOL COMPANY, OF ST. LOUIS, MISSOURI, A CORPORATION OF MISSOURI.

STEERING DEVICE.

No. 918,122.   Specification of Letters Patent.   Patented April 13, 1909.

Application filed October 5, 1908. Serial No. 456,156.

*To all whom it may concern:*

Be it known that I, CHARLES E. BROOKS, a citizen of the United States, and a resident of the city of St. Louis and State of Missouri, have invented a new and useful Improvement in Steering Devices, of which the following is a specification.

This invention relates to steering devices and it is more particularly adapted for use upon motor-driven vehicles and the like.

It has for its principal objects to secure a steady position of the steering axle and wheels of the vehicle and a tight working connection between the same and the steering post, to secure a positive and easy control of the steering mechanism, to provide for readily adjusting the working parts of the steering head and for taking up all looseness due to wear, and to attain certain other advantages hereinafter more fully appearing.

The invention consists principally in the parts and in the arrangements and combinations of parts of the steering head as will be hereinafter described and claimed.

In the accompanying drawings, forming part of this specification, and wherein like symbols refer to like parts wherever they occur, Figure 1 is a fragmentary plan view of the lower portion of the steering post and casing for the lever-actuating mechanism; Fig. 2 is a side elevation with the intermediate portion of the steering post broken away and showing the usual normal position of the parts when the device is mounted upon a motor-driven vehicle; Fig. 3 is an enlarged view partly in vertical longitudinal section and partly in side elevation with one half of the casing removed to show the steering lever actuating mechanism; Fig. 4 is a view partly in horizontal longitudinal section and partly in top plan; Fig. 5 is a side elevation of the intermediate rotatable element of the actuating mechanism with a portion of one of its side plates broken away; Fig. 6 is a vertical longitudinal section showing the actuating nuts detached; Fig. 7 is a view partly in vertical longitudinal section and partly in side elevation with one half of the casing removed and showing a modification of the device; and, Fig. 8 is a detail of one of the intermediate distance pieces.

The device comprises, preferably, a rotatable tubular steering rod or post 1 through which the rods for the controlling devices for the motor are usually placed. On the upper end of the steering post is mounted an ordinary hand wheel 2. The lower end of the steering post is swiveled or journaled in a casing 3. Preferably, this casing is made in two sections and divided longitudinally vertically. The two sections may be secured together in any desirable manner but preferably by through-bolts or screws 4 at each corner thereof. By this arrangement, the casing may be readily taken apart when it is desired to gain access to the parts of the mechanism contained therein. It also facilitates the assembling of the parts.

The lower end portion of the steering post is provided with right and left hand screw-threads 5 and 6, respectively, and upwardly a short distance from the left hand threaded portion 6, is a collar or annular shoulder 7. The outer or upper face 8 of this collar is adapted to bear against the inner face of a cap or thrust member 9 which has a screw-threaded engagement with a circular boss 10 at the end of the casing 3. The cap 9 has a split portion 11 and outwardly projecting lugs or ears 12 on each side thereof. These ears are perforated and one is threaded for the engagement of a clamping screw 13. By this arrangement, the cap may be securely held in its adjusted position.

Mounted on the threaded portion of the steering post are two oppositely disposed semi-cylindrical half-nuts or companion blocks 14, 15. The upper half-nut or block 14 is provided with counterpart threads 16 adapted to fit the left hand threads 6 on the steering post, and the lower half-nut or block 15 is provided with counterpart threads 17 adapted to fit the right hand threads 5. The respective half-nuts 14 and 15 are threaded from opposite ends for a portion of approximately one-half their lengths. The unthreaded portion of each of the half-nuts is counterbored to the depth of the threads as at 18, 19, so that said unthreaded portions may slidably fit over the peripheral faces of the threads 5 and 6, respectively, on the steering post. Extending laterally from the half-nuts 14, 15, are lugs or abutments 20, 21, respectively. The lower faces of the lugs 20, 21 or the faces away from the handle end of the steering post are preferably flat and arranged at right angles to the axis of the post. The lugs or abutments 20, 21 are adapted to bear against diametrically opposite cross members 22, 23, respectively, of a rotatable element or equalizing abutment comprising two circular disks or plates 24, 25, which are rigidly connected with the above mentioned cross-members 22, 23. Preferably, the cross members are formed integral with one of the circular side members and have reduced end portions which are fitted tightly in holes or seats provided therefor in the opposite side member. The parts may be rigidly held together by pins 26, as shown in Figs. 4 and 5 of the drawings. This construction permits of placing an antifriction sleeve or roller 27 on each of the cross members before the parts are secured together.

Extending outwardly from the centers of each of the circular side plates or disks 24, 25, are trunnions or stub shafts 28, 29, which are journaled in bushings or bearings 30 secured in side extensions or bosses 31 on the casing sections 3. These stub shafts or trunnions may be made of sufficient lengths so as to be supported or journaled at any desirable position on the vehicle frame. By pivotally mounting the trunnions on suitable brackets or supports 32 the angular position of the steering post 1 may be changed at will, it being only necessary to provide an adjustable brace or bracket on the body frame for rigidly holding the steering post in set position. In the drawings, the steering post is shown as projecting through a slot in the vehicle body and rotatably mounted in a member 33 which is adjustably secured on a sector shaped bracket 34 secured to the dash board and bottom of the vehicle. As shown, the adjustments are effected by providing the member 33 with ears 35 which are perforated to receive securing pins or bolts 36 which also engage the holes 37 in said bracket member 34. Obviously, however, other suitable devices may be employed for the purpose.

The steering finger or lever 38 may be secured on the trunnion 28 or 29, as the case may be, and at any convenient position thereon. This finger or lever 38 is provided on its outer end with a spherical portion 39 for the usual universal or ball and socket connection with the usual rod which connects the steering axle or wheels.

Normally, the half-nuts 14, 15 are placed on their respective threaded portions of the steering post as shown in Fig. 3. In this position, their respective projections 20, 21 bear against the cross members 22, 23, or the antifriction sleeves 27 thereon, of the rotatable abutment or element. By adjusting the cap or thrust bearing member 9 inwardly against the collar 7, the forward or driving faces of the threads on the steering post may be brought tightly against the driving faces of the counterpart threads on the respective half-nuts or blocks 14, 15. The rotatable abutment member or element constitutes an intermediate equalizing resistance. For example, should the threads 5 on the post or the counterpart threads 17 on the half-nut 15 wear faster than the opposite threads, or looseness or play otherwise occur therebetween, the half-nut 14 will tend to rotate said equalizing element by moving against the upper cross member 22 when the end thrust bearing 9 is moved inwardly. The lower cross member 23 will move in the opposite direction against the nut 15 and thereby the looseness or play between the threads is taken up, as well as any play which might occur in the trunnion bearings.

Preferably, the driving and resistance faces of the screw threads are so generated that at every point in such faces a line perpendicular to the axis of the screw will coincide with such faces. The back faces of the screw threads are preferably beveled. It is also preferable to provide two separate threads located at different longitudinal positions so that each will be continuous and will not interfere with the other threads and so as to get an accelerated movement of the driven parts and yet retain a great and continuous thread engagement between the half-nuts and screws. By this arrangement, the threads wear uniformly throughout and all play or looseness caused by wear may be taken up until the threads are worn almost entirely away. So, too, the peculiar shape of the screw-threads permits of placing the half-nuts sidewise or laterally upon the screw, and likewise permits their removal therefrom.

To prevent the lateral deflection of the half-nuts, they are mounted in guideways or seats at each end of the casing. Preferably, one seat is provided by boring the casing concentrically of the axis of the steering post as at 40, and the opposite seat is provided by fitting a cylindrical bushing 41 in a similar bore at the opposite end of the casing. The outer end of this bushing is provided with a reduced opening 42 in alinement with the axial bore of the steering post, and it is also provided with a seat 43 for the lower end of said post. The bushing 41 extends into the casing a sufficient distance to afford an ample bearing for the lower ends of half-nuts.

By the construction herein shown and described, the parts may be tightly adjusted and yet an easy movement of the working parts is attained, and the working parts all wear uniformly throughout, thereby overcoming the liability of wearing low places or shoulders which would prevent the smooth working of the device.

In Figs. 7 and 8 of the drawings, I have illustrated a modification of my device. In this construction the antifriction sleeve 27 is dispensed with and distance pieces or links 44 placed between the lugs 20, 21 on the half-nuts and the cross members 22, 23 on the rotatable equalizing abutment. Preferably, the distance pieces are rounded out on one side as at 45 so as to fit the round cross members, and they are also provided with rounded lugs 46 adapted to fit in counterpart sockets 47 in the lugs 20, 21.

In some cases, it may be desirable to provide a series of balls or other suitable anti-friction devices 48 for the end thrust bearings 7 and 9.

Obviously, the device admits of modification without departing from my invention, and, therefore, I do not wish to be limited to the exact constructions and arrangements shown.

What I claim as my invention, and desire to secure by Letters Patent is:

1. A steering gear comprising a casing, a steering post rotatably mounted therein and having continuous right and left hand screw threads thereon and an end thrust bearing portion, grooved companion blocks on opposite sides of said post, one of said blocks having a screw thread adapted to coöperate with said right hand thread and the other block having a screw thread adapted to coöperate with said left hand thread, said blocks also having companion end bearing portions and oppositely disposed lateral projections intermediate their ends, and a rotatable equalizing abutment member comprising two side plates having diametrically opposite cross-connecting members arranged in the path of the lateral projections on said companion blocks, and each of said side plates having outwardly extending trunnions, bearings in said casing for said trunnions, and a longitudinally adjustable abutment on said casing for the end thrust bearing on said steering post.

2. A steering gear comprising a casing, a steering post rotatably mounted therein and having separate right and left hand screw threads thereon and an end thrust bearing portion, oppositely disposed companion blocks having counterpart screw threads for the respective screw threads on said post, said blocks also having oppositely disposed lateral projections intermediate their ends and also having companion cylindrical end bearing-portions, the bearing for one end of said blocks comprising a bore in the end wall of said casing and the bearing for the opposite ends of said blocks comprising a bushing in the opposite end wall of said casing and extending inwardly therefrom, said bushing having a bore to receive the ends of said blocks and also having a seat for the end of said steering post, a rotatable equalizing abutment journaled in said casing intermediate of the ends of said blocks, said abutment comprising two side plates having diametrically disposed cross-connecting members arranged to bear against the respective lateral projections on said blocks, and each of said side plates having an outwardly extending trunnion, and a longitudinally adjustable abutment on said casing for the end thrust bearing on said steering post.

3. A steering gear comprising a rotatable abutment having a steering lever operatively connected thereto, a steering post rotatably mounted transversely of said rotatable abutment said steering post having right and left hand screw threads thereon at different longitudinal positions and also having an end thrust bearing portion, a pair of oppositely disposed companion half-nuts having counterpart screw threads for the respective screw threads on said steering post, and also having oppositely disposed lateral projections thereon between said rotatable abutment and said steering post end thrust bearing, a distance piece between each of said lateral projections and diametrically opposite points on said rotatable abutment, and a longitudinally adjustable abutment for said steering post end bearing portion.

4. A steering gear comprising a rotatable abutment having a central pivot and diametrically opposite bearing portions, a steering post rotatably mounted transversely of said rotatable element and having separate, continuous right and left hand screw-threads thereon at different longitudinal positions and also having an end thrust bearing portion, the driving and resisting faces of said screw thread being substantially perpendicular at every point with respect to the axis of said steering post, oppositely disposed companion half-nuts having counterpart screw threads for said screw threads on said steering post and having oppositely disposed lateral projections adapted to bear against the respective diametrically disposed bearing portions on said rotatable abutment, and a longitudinally adjustable abutment for the end thrust bearing portion of said steering post.

5. A steering gear comprising a casing, a steering post rotatably mounted therein and having uninterrupted right and left hand screw threads and an end thrust bearing portion thereon, an adjustable abutment on said casing for said end thrust portion, an equalizing abutment rotatably mounted on said casing and having diametrically opposite bearing portions arranged normally at right angles to the axis of said steering post, and companion half-nuts having counterpart screw threads adapted to fit the respective screw threads on said steering post and having oppositely disposed lateral projections interposed between said post end thrust abutment and said equalizing abutment and being also arranged to bear against the respective diametrically opposite bearing portions on said equalizing abutment.

6. A steering gear comprising a casing, a steering post rotatably mounted therein and having an end thrust bearing portion and uninterrupted right and left hand screw threads thereon, the driving and resisting faces of said threads being away from the end thrust bearing portion, and said driving and resisting faces being substantially at right angles at every point to the axis of said steering post and the opposite faces being at a less angle, an adjustable abutment for said steering post end thrust bearing portion, an equalizing abutment mounted in said casing and opposed to said first mentioned abutment, and companion half-nuts having counterpart screw threads adapted to fit the screw threads on said steering post and also having oppositely disposed lateral projections intermediate of said abutments and arranged to bear against said equalizing abutment.

Signed at St. Louis, Missouri, this 2nd day of October, 1908.

CHARLES E. BROOKS.

Witnesses:
G. A. PENNINGTON,
J. B. MEGOWN.